United States Patent Office 3,443,369
Patented May 13, 1969

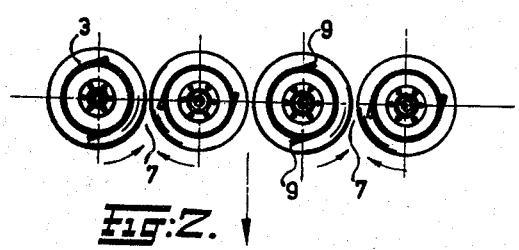
Fig:2.
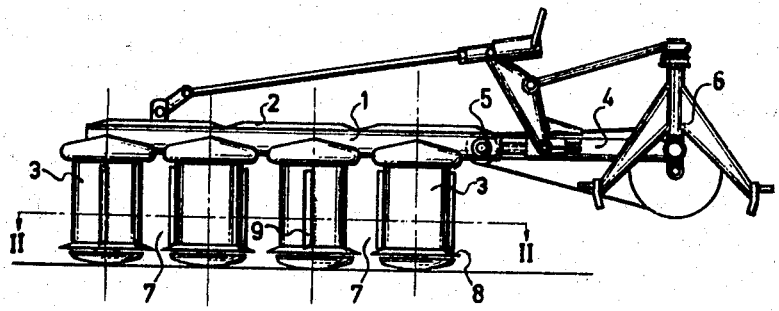
Fig:1.

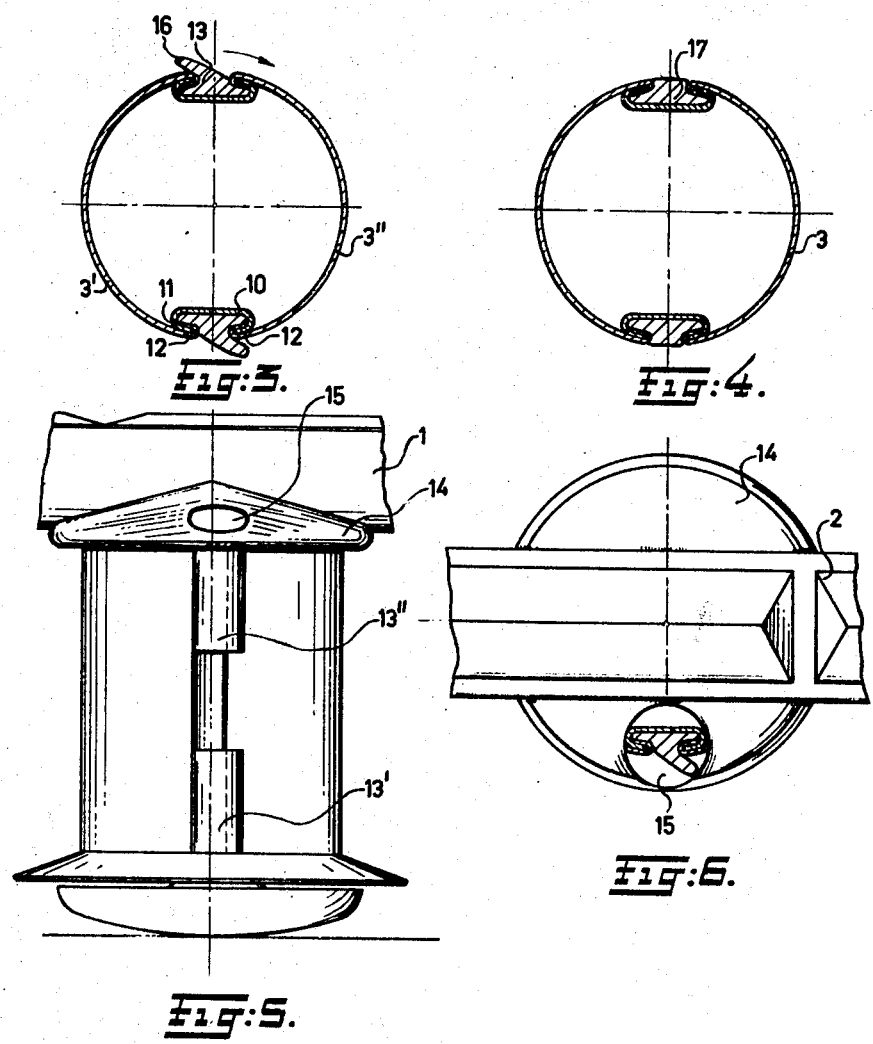

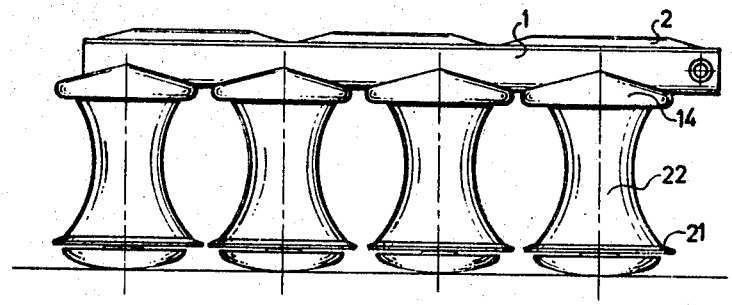
Fig: 8.
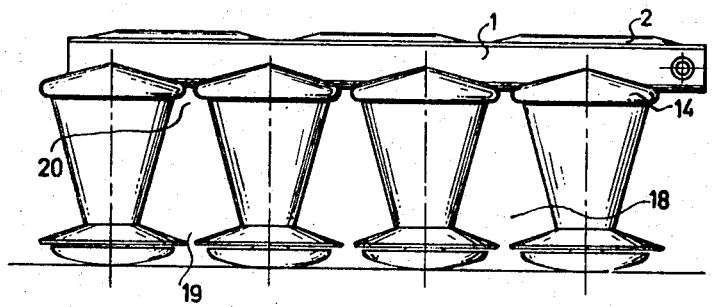
Fig: 7.

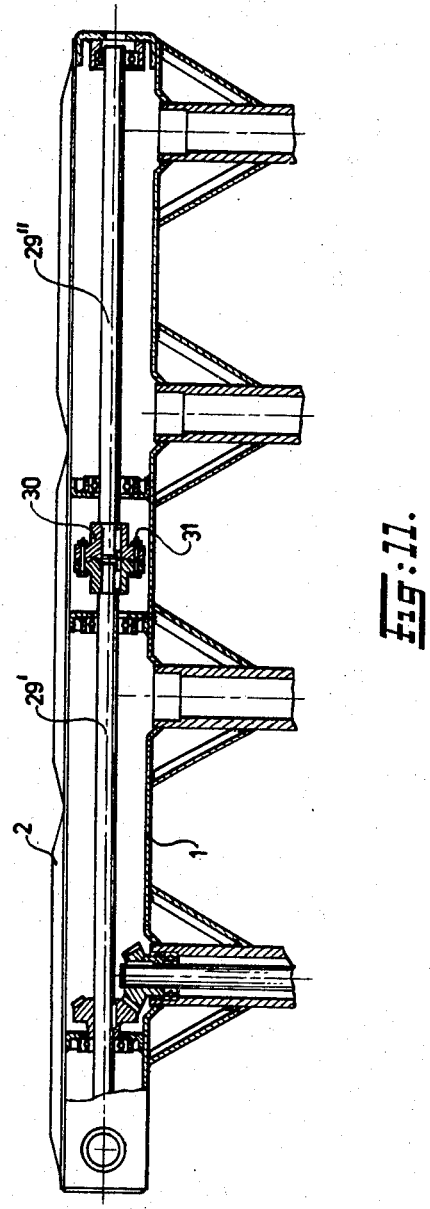

3,443,369
MOWING MACHINE
Petrus Wilhelmus Zweegers, Eindhovenschweg 2,
Geldrop, Netherlands
Filed Feb. 23, 1966, Ser. No. 529,310
Claims priority, application Netherlands, June 18, 1965,
6507844; Nov. 24, 1965, 6515279
Int. Cl. A01d 75/30, 55/18, 35/24
U.S. Cl. 56—6                                     8 Claims

ABSTRACT OF THE DISCLOSURE

Mowing machine including a pair of rotatable drums each carrying cutters near its lower end. Fins extend axially along drum surface and aid delivery of cut crop through slot between drums. Fins may be carried by recessed portions of drum spaced inwardly from generally circular outline of drum periphery. Walls of drum may be cylindrical or convex, or may be defined by two frusto-conical members arranged with their apexes directed toward each other.

---

This invention relates to a mowing machine having a frame which carries a plurality of juxtaposed, rotatable drums, the periphery of which is provided with a profile, a collar being mounted near the lower end of the drum and each collar carrying two or more cutters which may be rotated about the same axis as the drum. Between the adjacent drums there is a discharge gap for the crop, the lower end of the discharge gap being closed at least partially by said collars of the adjacent drums such that the cut crop is discharged rearwardly via the discharge gap without repeated contact with the cutters, as described in patent application No. 469,395, now U.S. Patent No. 3,391,522.

In said previous patent application the drum is shown as having the profile of a decagon and this profile is satisfactory for several types of crop.

However, according to the present improvement, all types of crop can be mowed because the periphery of each drum carries one or more fins in substantially axial direction.

Preferably the fins of two adjacent drums are mounted in staggered relationship so that the fins act as uniformly as possible on the crop passing between the two adjacent drums.

The fins may be inserted into slots of the cylindrical drums and may be easily removed. When very short crops are to be mowed, the fins may be entirely removed, which prevents undesired dispersion of the short mowed crop. In case it is not desired to remove the fins completely, one may use an embodiment in which the fins are divided into sections of part of the total length so that parts of the fins may be selectively used.

If desired, each fin may, from its connection with the drum, be rearwardly inclined with respect to the direction of rotation which provides for a minimum of damage to the crop.

Under certain conditions, the air displacement caused by protruding fins may be disadvantageous for the crop to be mowed, and in those cases the cylindrical drums may be provided with at least one flattened portion, said flattened portion carrying a vertical fin so that it does not substantially protrude beyond the circumferential circle of the drum.

In this embodiment, the air displacement may be substantially reduced whereas the conveying action of the drums is maintained. Moreover, the fins are protected against damage since they are located within the operating circumference of the drums.

If desired, an additional fin may be mounted on the first fin, said additional ledge being removable and/or adjustable. By this means, the drum may be adapted to the type of crop to be mowed whereas the additional fins, which are e.g. made of hardened spring steel, may be easily replaced when worn out or damaged. Also, it is possible to adapt the length or width of the additional fins to the conditions provided by the crop to be mowed. For instance, the additional fins may be provided only in the lower part of the drum and may project somewhat outside of the circumferential circle of the drum.

The drums and/or the fins provided thereon are preferably made of rubber, plastics or another material with sufficient elasticity to recover from deformations caused by obstacles, it being preferred that the fins are more easily deformable than the material of the drums. The drums and/or the fins may recover immediately from deformation caused by stones or the like, so that no damage is caused.

The passage of the crops through the gap between the drums may be improved by shaping the drums so that their diameter increases in the upper portion so that the discharge gap narrows in upward direction between the two drums. This may be obtained by composing the drums of a substantially cylindrical central portion and adjacent upper and lower collars which have the shape of a truncated cone, the apexes of said cones pointing toward each other.

The drums may also have a concave shape or they may be composed of two truncated cones which abut without an intervening cylindrical portion.

The invention is now elucidated with reference to the accompanying drawings.

FIG. 1 is a front view of a mowing machine according to the invention.

FIG. 2 is a section along the line II—II in FIG. 1.

FIG. 3 is a section of a drum with interchangeable fins.

FIG. 4 is a corresponding section in which dummy fins are used.

FIG. 5 is a side view of a drum with sectioned fins.

FIG. 6 is a plan view of a closure cap with an aperture.

FIG. 7 is a front view of a mowing machine with drums shaped as twin truncated cones.

FIG. 8 is a front view of a mowing machine with drums having a concave shape.

FIG. 11 is a section of the main frame beam of a mowing machine according to the invention.

Figure 10:
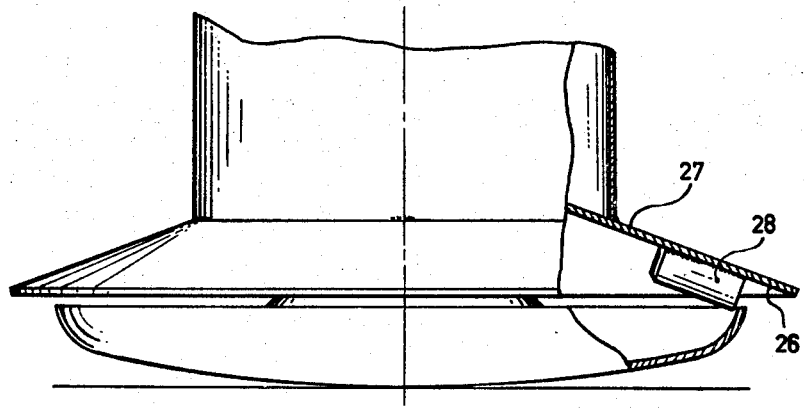
FIG. 10 is a side view, partially in section, of a collar with vanes.

The mowing machine according to FIG. 1 has a main frame beam 1, which is box shaped and which is closed by an embossed cover 2. The main frame beam 1 comprises the driving means for the drums 3. At the right end of the main frame beam 1, an intermediate beam 4 is mounted on trunnion 5 so as to pivot vertically. The intermediate beam 4 is mounted for vertical pivotal movement on the support 6, which serves for suspending the machine from the hydraulic lifting device of a tractor. The longitudinal axis of the main frame beam is normal to the direction of movement of the tractor during the operation of the machine. The beam carries two pairs of cooperating durms 3, which drums rotate synchronously but in opposite directions, see the arrows in FIG. 2.

The lower ends of the drums carry cutters and the crop mowed by the cutters is conveyed rearwardly through the discharge gaps 7 between each pair of drums. A cone shaped collar 8 is mounted on the bottom of each drum 3 and makes the same number of revolutions as said drum. Said collar 8 closes the greater part the discharge gap 7 at its lower end and also aids in conveying the crop through the discharge gap. Each drum 3 is provided with two fins or strips 9 which are e.g. welded in axial direction to the outer wall of the drums 3, so as to extend at a sharp angle with said wall. Said strips 9 extend over the full length of the drum 3 and are so mounted that the strips of adjacent cooperating drums are staggered. The angle at which the strip 9 is mounted on the drum opens away from the direction of rotation. Under certain conditions, it may be necessary to remove the strips.

FIG. 3 shows an embodiment in which the fins or strips may easily be removed without the use of tools. Each drum comprises two halves 3', 3" and these halves are connected to each other by a C-shaped hollow member 10, having hook-shaped edges 11, which cooperate with the hook-shaped edges 12 of the drum-halves 3', 3", said edges e.g. being connected by spot-welding. The strip 13 is positioned in the hollow interior of the C-shaped piece 10. The strip 13 may be removed without removal of the closure cap 14 (FIG. 5) since said cap is formed with an aperture 15, of which, the spacing between the aperture and the axis of rotation being equal to the spacing between the strip and said axis, see FIG. 6.

It is preferred to make the strips of a material which has a lower strength than the material of the drum, so as to prevent damage to the drum when, during operation, stones or the like are caught behind the strips. The strips may be made of a plastic, e.g. polyamide, and if a stone hits such a strip, it will break away a portion of the strip. This strip may have a rounded shape as at 16, which also limits the damage by stones etc.

FIGURE 5 shows a fin or strip 13 composed of several sections 13' and 13". Under certain conditions, the use of a strip 13 which extends over the full length of the drum will not be feasible and under those conditions, a portion of the strip may be removed. The removed portion may be replaced by a strip 17 of the same inner profile, but without a protruding portion, so that the circular circumference of the drum 3 is continuous, see FIG. 4.

According to a preferred embodiment, not shown, the drum may be made of a material such as polyamide which is sufficiently elastic to recover from indentations caused by stones or the like.

Preferably, the drum widens toward the top, see FIG. 7. Accordingly, the discharge gap 18 is wider at the lower end 19 where the heavier crop passes and it is narrower at the upper end 20, which is favourable for good discharge of the crop through the discharge gap.

FIG. 8 shows another embodiment with a favourable shape of the discharge gap. The drums are concave which has also the advantage that the lower flaring portion 21 of the drum 22 can be used as the collar, which carries the cutters.

Figure 9:
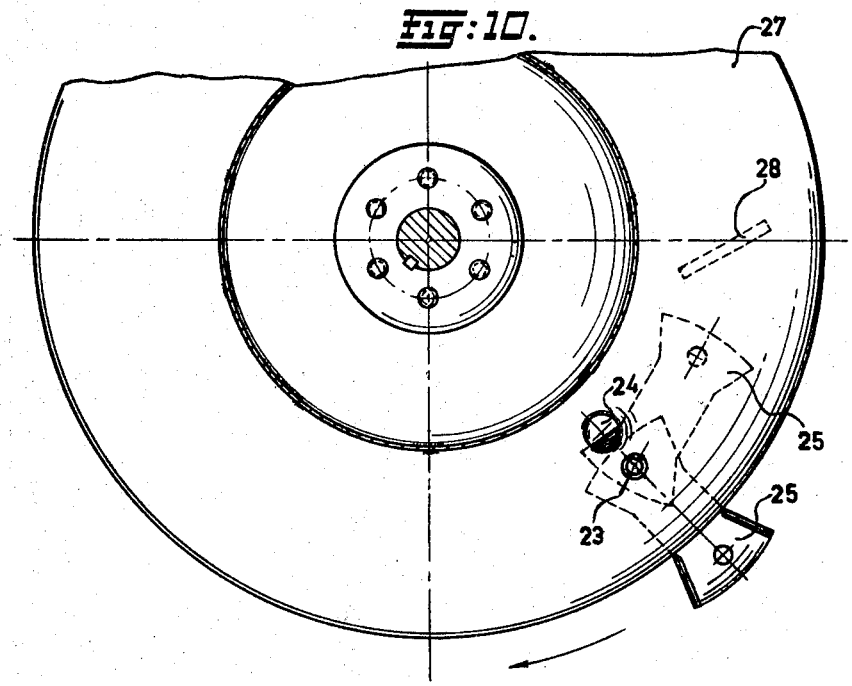
FIG. 9 is a plan view of a collar with an inspection hole.

According to FIGURE 9, an inspection hole 24 is provided above the location where the cutters are mounted, as at 23. Since the cutter 25 can freely pivot, the cutter 25 may be positioned fully under the collar 27 so that it is not visible from the outside but may be seen through the inspection hole.

The lower side 26 of the collar 27 can also carry substantially radially directed vanes 28 of such a size that they prevent damage to the mounting means of the cutter. These vanes cause an outwardly directed air flow which keeps dirt and plant portions away from the mounting device.

The drive shaft 29 of the drums, which is journalled in the main frame beam, may be divided into two or more parts 29' and 29" and those parts may be connected by means of a coupling 30 which comprises e.g. two flanges fixed to the adjacent ends of the shaft parts 29' and 29", said flanges being interconnected by pins 31 which are so designed that they break when the shaft is overloaded, see FIGURE 11.

In an embodiment, not shown, the fins or strips 9 each comprise a rod of rectangular stock mounted on the periphery of a drum. The strip may e.g. have a length which is about equal to the height of the drum and it may be mounted so that the wider side of the rectangular rod makes a sharp angle with the outer wall of the drum, said sharp angle opening away from the direction of rotation.

The strips may be made of rubber, plastics or even hardwood. These substances may easily be given a special profile, e.g., as indicated in FIG. 3.

Figure 13:
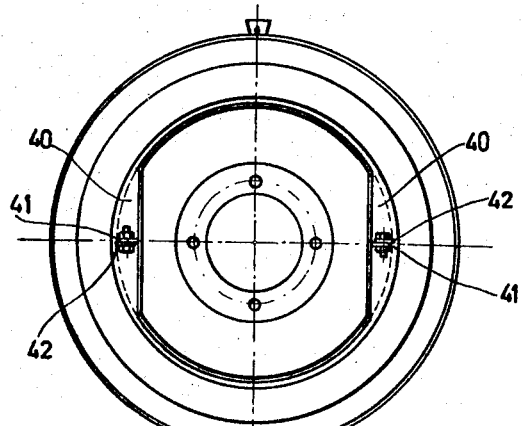
FIG. 13 is a plan view of a drum with flattened portions.
Figure 12:
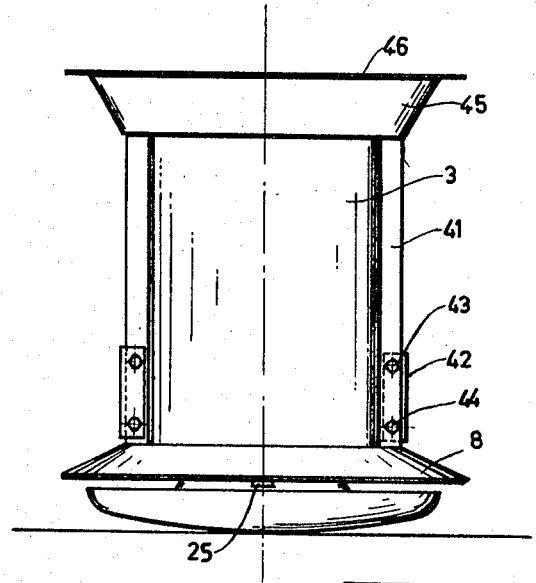
FIG. 12 is a side view of a drum with flattened portions.

In the embodiment of FIGURES 12 and 13, the cylindrical drums 3 have one or more flattened portions 40, and a vertical strip 41 is mounted in the centre of each flattened portion. In the shown embodiment, there are two flattened portions 40 and two strips 41 mounted so that both strips 41 are in the same median plane of the drum 3. However, other positions are also possible. Said strips 41 do not protrude substantially beyond the circumscribed circle of the drum 3. The lower part of the strip 41 carries a short additional strip 42 which protrudes somewhat further and may be adjustable in radial direction. The additional strips 42 are fixed by screws 43, 44 so that they can easily be replaced, e.g. by higher or wider strips.

In this embodiment, the drum 3 comprises not only a collar 8 at the lower end but also a collar 45 at the upper end, said latter collar having the shape of a truncated cone with downwardly directed top angle. A disc 46 which protrudes somewhat beyond the cone 45 is mounted on top of said cone. The flat discs 46 of two adjacent cooperating drums almost touch each other, so that they close the upper end of the discharge gap between the drums and the conveying action of the drums is also sufficient in the upper portion of the gap.

What I claim is:
1. Mowing machines having a frame which carries a plurality of juxtaposed rotatable drums of a certain profile, a collar near the lower end of each drum carrying at least two cutters for rotation about the same axis as the drum, characterized in that the drums are made of material having sufficient elasticity to recover from deformations caused by obstacles.

2. A mowing machine comprising a frame carrying a plurality of rotary mowing devices, each mowing device comprising a drum, at least two cutting knives mounted near the lower end of the drum, and means for rotating the drum and the cutting knives carried by it about a substantially vertical axis, characterized by the outer periphery of said drum being generally circular in cross-section but having at least one recessed portion spaced radially inwardly from the circular outline of the remainder of the drum periphery, and a part carried by said drum and extending axially along its outer surface, said part presenting a surface facing the direction of rotation of said drum, and said surface extending between said recessed portion of said drum and the circular outline of the periphery of said drum without protruding substantially beyond said circular outline.

3. A mowing machine according to claim 2, wherein said recessed portion is a flattened portion of said drum, said part being carried by said flattened portion.

4. A mowing machine according to claim 3 wherein said part carries an additional strip removably and/or adjustably arranged thereon.

5. A mowing machine according to claim 4 wherein said additional strip extends along only the lower portion of said part and protrudes radially beyond the circular outline of said drum periphery.

6. A mowing machine according to claim 4 wherein said additional strip is made of hardened spring steel.

7. Mowing machine according to claim 2, said part is formed of a material which can be deformed more easily than the material of the drums.

8. Mowing machine according to claim 2, characterized in that each of the drums comprise a substantially cylindrical central portion and adjacent upper and lower collars in the shape of a truncated cone, the apexes of said truncated cones being directing toward each other.

References Cited

UNITED STATES PATENTS

| | | | |
|---|---|---|---|
| 1,630,097 | 5/1927 | Scranton | 56—17 XR |
| 1,779,020 | 10/1930 | Swint | 56—503 |
| 2,489,730 | 11/1949 | Soenksen | 56—25.4 |
| 3,115,741 | 12/1963 | Robinson | 56—503 |

FOREIGN PATENTS

| | | |
|---|---|---|
| 228,943 | 6/1960 | Australia. |
| 843,779 | 8/1960 | Great Britain. |

RUSSELL R. KINSEY, *Primary Examiner.*

U.S. Cl. X.R.

56—25.4, 192, 503